United States Patent
Park et al.

(10) Patent No.: US 10,297,072 B2
(45) Date of Patent: May 21, 2019

(54) 3D RENDERING METHOD AND APPARATUS

(71) Applicant: Samsung Electronics Co., Ltd., Suwon-si (KR)

(72) Inventors: Seungin Park, Yongin-si (KR); Minsu Ahn, Seoul (KR); Hyong Euk Lee, Suwon-si (KR); Inwoo Ha, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 290 days.

(21) Appl. No.: 14/926,859

(22) Filed: Oct. 29, 2015

(65) Prior Publication Data

US 2016/0171753 A1    Jun. 16, 2016

(30) Foreign Application Priority Data

Dec. 15, 2014 (KR) .................. 10-2014-0180315

(51) Int. Cl.
| | |
|---|---|
| *G06T 15/50* | (2011.01) |
| *G06T 17/00* | (2006.01) |
| *G06K 9/00* | (2006.01) |
| *G06K 9/62* | (2006.01) |

(52) U.S. Cl.
CPC .......... *G06T 15/50* (2013.01); *G06K 9/00624* (2013.01); *G06K 9/6202* (2013.01); *G06T 15/506* (2013.01); *G06T 17/00* (2013.01); *G06T 2215/12* (2013.01)

(58) Field of Classification Search
CPC ....... G06T 15/50; G06T 15/506; G06T 17/00; G06T 2215/12; G06K 9/00624; G06K 9/6202

See application file for complete search history.

(56) References Cited

U.S. PATENT DOCUMENTS

| | | | |
|---|---|---|---|
| 6,362,822 B1 * | 3/2002 | Randel | G06T 15/405 345/426 |
| 6,639,594 B2 | 10/2003 | Zhang et al. | |
| 8,223,148 B1 | 7/2012 | Carr et al. | |
| 8,270,768 B2 | 9/2012 | Ernst et al. | |

(Continued)

FOREIGN PATENT DOCUMENTS

| | | | |
|---|---|---|---|
| JP | 4464657 B2 | 5/2010 | |
| JP | 5466744 B2 | 4/2014 | |

(Continued)

OTHER PUBLICATIONS

A. Keller, "Instant Radiosity," *Proceedings of the 24th Annual Conference on Computer Graphics and Interactive techniques (SIGGRAPH '97)*, 1997, pp. 49-56, ACM Press/Addison-Wesley Publishing Company, conference held Aug. 3-8, 1997, Los Angeles.

(Continued)

*Primary Examiner* — William A Beutel
(74) *Attorney, Agent, or Firm* — NSIP Law

(57) ABSTRACT

A three-dimensional (3D) rendering method for rendering a 3D model includes rendering a 3D model from each viewpoint of direct light sources, obtaining scene information on scenes rendered from each viewpoint of the direct light sources, generating a matched image in which the scenes are matched based on the scene information, and sampling at least one indirect light source from the matched image.

13 Claims, 11 Drawing Sheets

(56) References Cited

U.S. PATENT DOCUMENTS

| | | | |
|---|---|---|---|
| 8,314,797 B1* | 11/2012 | Krishnaswamy | 345/419 |
| 2014/0043345 A1 | 2/2014 | Song | |

FOREIGN PATENT DOCUMENTS

| | | |
|---|---|---|
| KR | 10-0938889 B1 | 1/2010 |
| KR | 10-0951121 B1 | 4/2010 |
| KR | 10-1080508 B1 | 11/2011 |
| KR | 10-1100650 B1 | 1/2012 |
| KR | 10-1334187 B1 | 12/2013 |
| WO | WO 2006/075304 A2 | 7/2006 |

OTHER PUBLICATIONS

C. Dachsbacher et al., "Reflective Shadow Maps," *Proceedings of the 2005 Symposium on Interactive 3D Graphics and Games (I3D '05)*, 2005, pp. 203-208 and 231, ACM, New York, conference held Apr. 3-6, 2005, Washington, DC, paper presented on Apr. 6, 2005.

P. Clarberg et al., "Wavelet Importance Sampling: Efficiently Evaluating Products of Complex Functions," *ACM Transactions on Graphics—Proceedings of ACM SIGGRAPH 2005*, vol. 24, No. 3, Jul. 2005, pp. 1169-1175, ACM, New York, conference held Jul. 31-Aug. 4, 2005, Los Angeles, paper presented on Aug. 4, 2005.

R. Prutkin et al., "Reflective Shadow Map Clustering for Real-Time Global Illumination," *Proceedings of the 33rd Annual Conference of the European Association for Computer Graphics (Eurographics 2012—Short Papers)*, 2012, pp. 9-12, The Eurographics Association, Geneva, Switzerland, conference held May 13-18, 2012, Cagliari, Sardinia, Italy, paper presented on May 15, 2012.

T. Ritschel, et al., "Imperfect Shadow Maps for Efficient Computation of Indirect Illumination." *ACM SIGGRAPH Asia 2008 Papers on, SIGGRAPH Asia '08*, New York, NY, Dec. 1, 2008, pp. 1-8.

G. Papaioannou, "Real-Time Diffuse Global Illumination Using Radiance Hints." *Proceedings of the ACM SIGGRAPH Symposium on High Performance Graphics*. ACM, New York, NY Aug. 5, 2011, pp. 15-24.

Extended European Search Report dated Jun. 3, 2016 in counterpart European Application No. 15199614.7 (6 pages in English).

* cited by examiner

3D RENDERING METHOD AND APPARATUS

CROSS-REFERENCE TO RELATED APPLICATION(S)

This application claims the benefit under 35 USC 119(a) of Korean Patent Application No. 10-2014-0180315 filed on Dec. 15, 2014, in the Korean Intellectual Property Office, the entire disclosure of which is incorporated herein by reference for all purposes.

BACKGROUND

1. Field

The following description relates to image processing technology for rendering a three-dimensional (3D) model.

2. Description of Related Art

Three-dimensional (3D) rendering is a field of computer graphics in which a 3D model is rendered. The 3D rendering is used in various application fields including virtual reality, animations, and movies. Examples of the 3D rendering include ray tracing that renders a 3D model by tracing a route through which light radiated from a light source is reflected from a surface of an object, radiosity rendering that considers not only a direct illumination effect but also an indirect illumination effect of reflected light and diffused reflection resulting from direct illumination of an object, and rasterization rendering that renders a 3D model by converting vector data to a pixel pattern image.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a three-dimensional (3D) rendering method for rendering a 3D model includes rendering the 3D model from each viewpoint of direct light sources; obtaining scene information on scenes rendered from each viewpoint of the direct light sources; generating a matched image in which the scenes are matched based on the scene information; and sampling at least one indirect light source from the matched image.

The generating of the matched image may include generating the matched image by combining matched regions in the scenes.

The scene information may include attribute information including any one or any combination of any two or more of an intensity, a normal, a color, a reflected flux, a position, and a depth value of pixels of each scene.

The generating of the matched image may include generating matched images in which the scenes are matched based on the attribute information.

The generating of the matched images may include generating a matched image associated with first attribute information of the attribute information by matching the scenes based on the first attribute information; and generating a matched image associated with second attribute information of the attribute information based on a result of matching the scenes based on the first attribute information.

The generating of the matched image may include generating the matched image based on camera parameter information associated with each viewpoint of the direct light sources.

The sampling of the indirect light source may include dividing the matched image into a plurality of regions; and sampling the indirect light source in a region of interest in which the indirect light source is to be sampled among the regions.

The method may further include rendering the 3D model by applying, to the 3D model, an indirect lighting effect of the at least one sampled indirect light source.

The direct light sources may directly radiate light to a 3D object; and the at least one indirect light source may radiate light from a region in which the light radiated from the direct light sources is reflected, refracted, or diffracted.

In another general aspect, a non-transitory computer-readable storage medium stores instructions to cause computing hardware to perform the method described above.

In another general aspect, a three-dimensional (3D) rendering method for rendering a 3D model includes rendering the 3D model from each viewpoint of a portion of all direct light sources; obtaining scene information on scenes rendered from each viewpoint of the portion of the direct light sources; generating a first image in which the scenes are matched based on the scene information; and sampling at least one indirect light source from the first image.

The method may further include generating a second image by rendering the 3D model from a viewpoint of a remaining direct light source not included in the portion of the direct light sources; and sampling at least one indirect light source from the second image.

The method may further include rendering the 3D model by applying, to the 3D model, an indirect lighting effect of the indirect light sources sampled from the first image and the second image.

The generating of the first image may include generating the first image by combining matched regions in the scenes.

The scene information may include attribute information including any one or any combination of any two or more of an intensity, a normal, a color, a reflected flux, a position, and a depth value of pixels of each scene.

In another general aspect, a three-dimensional (3D) rendering method for rendering a 3D model includes comparing scenes obtained by rendering the 3D model from each viewpoint of direct light sources; determining whether to generate a matched image in which the scenes are matched; generating the matched image in which the scenes are matched based on scene information on the scenes in response to a result of the determining being to generate the matched image; and sampling at least one indirect light source from the matched image.

The determining of whether to generate the matched image may include determining to generate the matched image in response to a size of matched regions in the scenes or a ratio of the size of the matched regions to a size of the scenes satisfying a predetermined condition.

The generating of the matched image may include generating the matched image by combining matched regions in the scenes.

The scene information may include attribute information including any one or any combination of any two or more of an intensity, a normal, a color, a reflected flux, a position, and a depth value of pixels of each scene.

In another general aspect, a three-dimensional (3D) rendering apparatus includes a renderer configured to render a 3D model from each viewpoint of direct light sources; and a scene information storage configured to store scene information on scenes rendered from each viewpoint of the direct light sources; wherein the renderer may be further configured to generate a matched image in which the scenes are matched based on the scene information, and sample at least one indirect light source from the matched image.

The renderer may be further configured to generate the matched image by combining matched regions in the scenes.

The scene information may include attribute information including any one or any combination of any two or more of an intensity, a normal, a color, a reflected flux, a position, and a depth value of pixels of each scene.

The renderer may be further configured to determine whether to generate the matched image by comparing the scenes, and generate the matched image based on the scene information on the scenes in response to a result of the determining being to generate the matched image.

The renderer may be further configured to generate the matched image based on camera parameter information associated with each viewpoint of the direct light sources.

The renderer may be further configured to render the 3D model by applying, to the 3D model, an indirect lighting effect of the at least one sampled indirect light source.

In another general aspect, a three-dimensional (3D) rendering apparatus includes a renderer configured to render a 3D model from each viewpoint of a portion of all direct light sources; and a scene information storage configured to store scene information on scenes rendered from each viewpoint of the portion of the direct light sources; wherein the renderer may be further configured to generate a first image in which the scenes are matched based on the scene information, and sample at least one indirect light source from the first image.

The renderer may be further configured to generate a second image by rendering the 3D model from a viewpoint of a remaining direct light source not included in the portion of the direct light sources, and sample at least one indirect light source from the second image.

The renderer may be further configured to render the 3D model by applying, to the 3D model, an indirect lighting effect of the indirect light sources sampled from the first image and the second image.

In another general aspect, the three-dimensional (3D) rendering method for rendering a 3D model includes rendering the 3D model from respective viewpoints of direct light sources; generating a composite image from a result of the rendering; and sampling an indirect light source from the composite image.

The rendering of the 3D model may produce scenes containing matched regions, the scenes containing the matched regions being respectively rendered from the respective viewpoints of at least two of the direct light sources; and the generating of the composite image may include combining the scenes containing the matched regions to obtain the composite image.

The rendering of the 3D model may produce scenes respectively rendered from the respective viewpoints of the direct light sources; the method may further include obtaining scene information of each of the scenes; and the generating of the composite image may include identifying matched regions in the scenes based on the scene information; and combining the scenes containing the matched regions to obtain the composite image.

The scenes may include scenes associated with a plurality of attributes rendered from each of the respective viewpoints of the direct light sources; and the identifying of the matched regions may include identifying the matched regions based on only one of the attributes.

The combining of the scenes containing the matched regions may include combining scenes containing the matched regions associated with all of the plurality of attributes based on the matched regions identified based on only one of the attributes.

The attributes may include any two or more of an intensity, a normal, a color, a reflected flux, a position, and a depth value.

The sampling of the indirect light source may include sampling the indirect light source only one time and only from the composite image.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or methods described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

The terminology used herein is for the purpose of describing particular examples only, and is not intended to limit the scope of the disclosure. As used herein, the singular forms "a," "an," and "the" are intended to include the plural forms as well, unless the context clearly indicates otherwise. It will be further understood that the terms "include" and/or "have," when used in this specification, specify the presence of stated features, numbers, operations, elements, components, or combinations thereof, but do not preclude the presence or addition of one or more other features, numbers, operations, elements, components, or combinations thereof.

Figure 1:
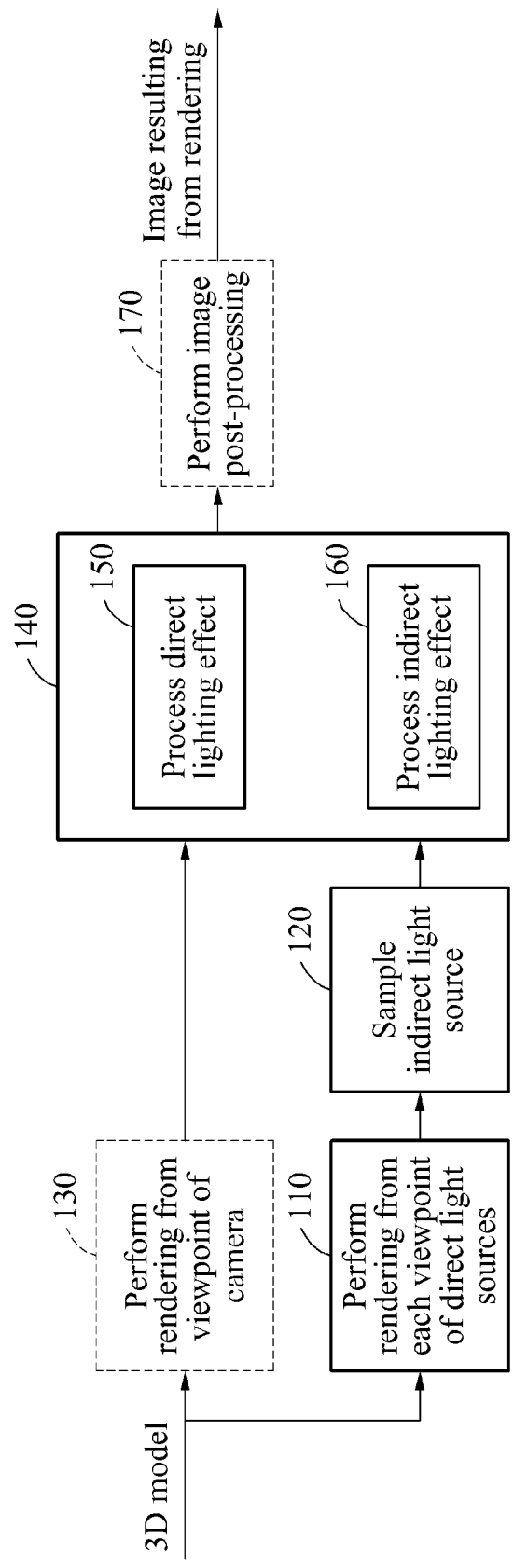
FIG. 1 is a diagram illustrating an example of an overall process of rendering a three-dimensional (3D) model by a 3D rendering apparatus.

FIG. 1 is a diagram illustrating an example of an overall process of rendering a three-dimensional (3D) model by a 3D rendering apparatus.

The 3D rendering apparatus renders the 3D model and outputs a resulting image obtained through the rendering. The 3D rendering apparatus renders the 3D model by applying a global illumination effect to the 3D model. The 3D rendering apparatus generates a detailed resulting image obtained through the rendering by applying, to the 3D model, an illumination effect by indirect light sources in addition to direct or primary light sources.

In computer graphics, the direct light sources and the indirect light sources are virtual light sources that assign the illumination effect to the 3D model. A direct light source is a light source that directly radiates light to the 3D model, and an indirect light source is a light source that radiates light from a region in which the light radiated from the direct light source is reflected, refracted, or diffracted. The 3D rendering apparatus applies a more realistic illumination effect by appropriately arranging the indirect light sources in the 3D model.

The 3D rendering apparatus controls the illumination effect to be represented in a rendered image of the 3D model by adjusting a region in the 3D model in which the indirect light sources are to be arranged or a number of the indirect light sources to be arranged in the 3D model. In an environment in which there are a plurality of direct light sources directly radiating the light to the 3D model, the 3D rendering apparatus effectively samples the indirect light sources generated by the direct light sources. The sampling of the indirect light sources is an operation of determining the region in the 3D model in which the indirect light sources are to be arranged and the number of the indirect light sources to be arranged.

FIG. 1 illustrates a process of applying the global illumination effect to the 3D model when the 3D rendering apparatus renders the 3D model.

Referring to FIG. 1, in operation 110, the 3D rendering apparatus renders the 3D model from each viewpoint of direct light sources. The 3D rendering apparatus renders the 3D model from each viewpoint of the direct light sources, and obtains information associated with the rendering from each viewpoint of the direct light sources.

In operation 120, the 3D rendering apparatus samples an indirect light source to be applied to the 3D model. The 3D rendering apparatus matches scenes rendered from each viewpoint of the direct light sources, generates a matched image based on the information obtained in operation 110, and samples the indirect light source using the matched image. The 3D rendering apparatus samples the indirect light source from the matched image using any of various sampling methods known to one of ordinary skill in the art.

In operation 130, the 3D rendering apparatus selectively renders the 3D model from a camera viewpoint for deferred rendering. The 3D rendering apparatus renders the 3D model from the camera viewpoint and obtains information associated with the rendering from the camera viewpoint for processing a direct lighting effect and an indirect lighting effect. The information associated with the rendering from the camera viewpoint may include, for example, information including any one or any combination of any two or more of a depth, a normal, and a color of the 3D model.

In operation 140, the 3D rendering apparatus renders the 3D model by applying an illumination effect by the direct light sources and the indirect light source to the 3D model. The 3D model rendering apparatus renders the 3D model using the information associated with the rendering from each viewpoint of the direct light sources obtained in operation 110 and the information associated with the rendering from the camera viewpoint obtained in operation 130.

In operation 150, during the rendering of the 3D model, the 3D rendering apparatus applies the direct lighting effect to the 3D model by processing the direct lighting effect of the direct light sources. In operation 160, the 3D rendering apparatus applies the indirect lighting effect to the 3D model by processing the indirect lighting effect of the indirect source sampled in the sampling operation. The 3D rendering apparatus implements the global illumination effect by applying the direct lighting effect and the indirect lighting effect.

For example, the 3D rendering apparatus applies the global illumination effect to the 3D model by combining a result of direct light shading and a result of indirect light shading. The direct light shading is a method of changing an illumination intensity of a surface of a 3D object based on a distance and an angle of light radiated from a direct light source. The indirect light shading is a method of changing the illumination intensity of the surface of the 3D object included in the 3D model based on a distance and an angle of light radiated from an indirect light source in a process of rendering the 3D model.

In operation 170, the 3D rendering apparatus selectively performs image post-processing on a resulting image obtained by rendering the 3D model. For example, the 3D rendering apparatus applies, to the resulting image, various image post-processing operations such as anti-aliasing and a lens glare effect.

The 3D rendering apparatus may be embedded in, for example, a personal computer (PC), a smartphone, or a tablet PC to render a 3D model. For example, the 3D rendering apparatus may render a 3D model in a game, a movie, a user interface, a virtual reality, or an augmented reality, and output a resulting image obtained through the rendering.

Figure 2:
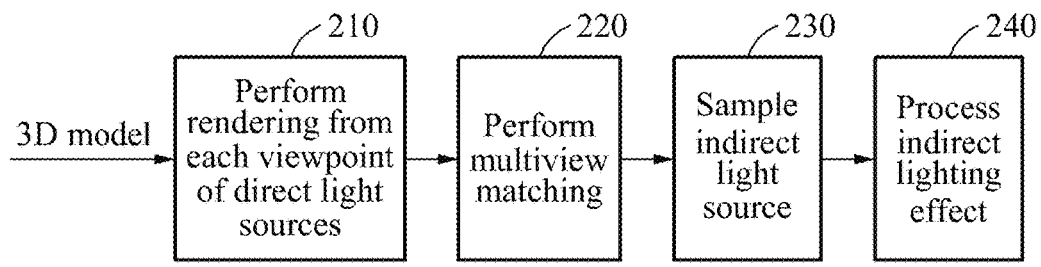
FIG. 2 is a diagram illustrating an example of a process of sampling an indirect light source and processing an indirect lighting effect by a 3D rendering apparatus.

FIG. 2 is a diagram illustrating an example of a process of sampling an indirect light source and processing an indirect lighting effect by a 3D rendering apparatus.

Referring to FIG. 2, in operation 210, the 3D rendering apparatus renders a 3D model from each viewpoint of direct light sources in an environment including a plurality of direct light sources. The 3D rendering apparatus renders the 3D model from each viewpoint of the direct light sources, and stores scene information on scenes rendered from each viewpoint of the direct light sources. The scene information is stored in a general memory or a buffer.

The 3D model is rendered from each viewpoint of the direct light sources based on each of one or more attributes. For example, the 3D rendering apparatus renders the 3D model from each viewpoint of the direct light sources based on each of a plurality of attributes including, for example, an intensity, a normal, and a depth value, and stores the scene information on the scenes rendered based on each attribute.

In operation 220, the 3D rendering apparatus generates a matched image in which the scenes rendered from each viewpoint of the direct light sources are matched by performing multiview matching. The 3D rendering apparatus may generate a single matched image or a plurality of matched images. The 3D rendering apparatus identifies identical regions corresponding to each other in the scenes rendered from each viewpoint of the direct light sources using information on the scenes rendered from each viewpoint of the direct light sources, and generates the matched image by combining the scenes rendered from each viewpoint of the direct light sources by combining the identical regions. Since the matched image is generated by combining the scenes rendered from each viewpoint of the direct light sources, the matched image is a composite image of the scenes rendered from each viewpoint of the direct light sources.

In one example, the 3D rendering apparatus determines a reference direct light source among the direct light sources, and changes a result of rendering from each viewpoint of other direct light sources not including the reference direct light source based on a viewpoint of the reference direct light source. The 3D rendering apparatus may readily change the result of the rendering from each viewpoint of the other direct light sources to the viewpoint of the reference direct light source using camera parameter information of a camera used for rendering from each viewpoint of the direct light sources. The 3D rendering apparatus generates the matched image by combining a result of the rendering from the viewpoint of the reference direct light source and the changed result of the rendering from each viewpoint of the other direct light sources.

In operation 230, the 3D rendering apparatus samples an indirect light source from the matched image. The 3D rendering apparatus samples the indirect light source from the matched image using any of various sampling methods known to one of ordinary skill in the art. For example, the 3D rendering apparatus samples the indirect light source from the matched image using an importance sampling method. In the importance sampling method, the 3D rendering apparatus determines a probability that an indirect light source is to be sampled in each region of the matched image based on attributes, for example, an intensity, a color, and a flux, indicated in the matched image, and samples the indirect light source from the matched image based on the determined probability. Various examples of the importance sampling method are well known to one of ordinary skill in the art, and thus the importance sampling method will not be described in detail here.

In a case in which there are a plurality of direct light sources in a 3D model to which a global illumination effect is to be applied, the 3D rendering apparatus performs the operation of sampling the indirect light source only once based on the matched image without sampling the indirect light source several times based on each viewpoint of the direct light sources. Thus, the 3D rendering apparatus improves a processing speed of the rendering. In addition, through the matching operation through which the matched image is generated, overlapping of the scenes rendered from each viewpoint of the direct light sources is eliminated, and thus repetitive sampling of the indirect light source in identical regions is prevented. Further, when the direct light sources have different characteristics with respect to one attribute, the different characteristics of the direct light sources may be processed together by combining them in the sampling of the indirect light source from the matched image, and thus a quality or a definition of a resulting image obtained by the rendering is improved.

In operation 240, the 3D rendering apparatus processes an indirect lighting effect of the indirect light source sampled from the matched image. The 3D rendering apparatus calculates an indirect light shading effect using the sampled indirect light source, and applies the calculated indirect light shading effect to the 3D model. The 3D rendering apparatus arranges the indirect light source in a position in the 3D model corresponding to a position of the sampled indirect light source in the matched image, and applies the indirect lighting effect of the indirect light source to the 3D model to render the 3D model.

Figure 3A:
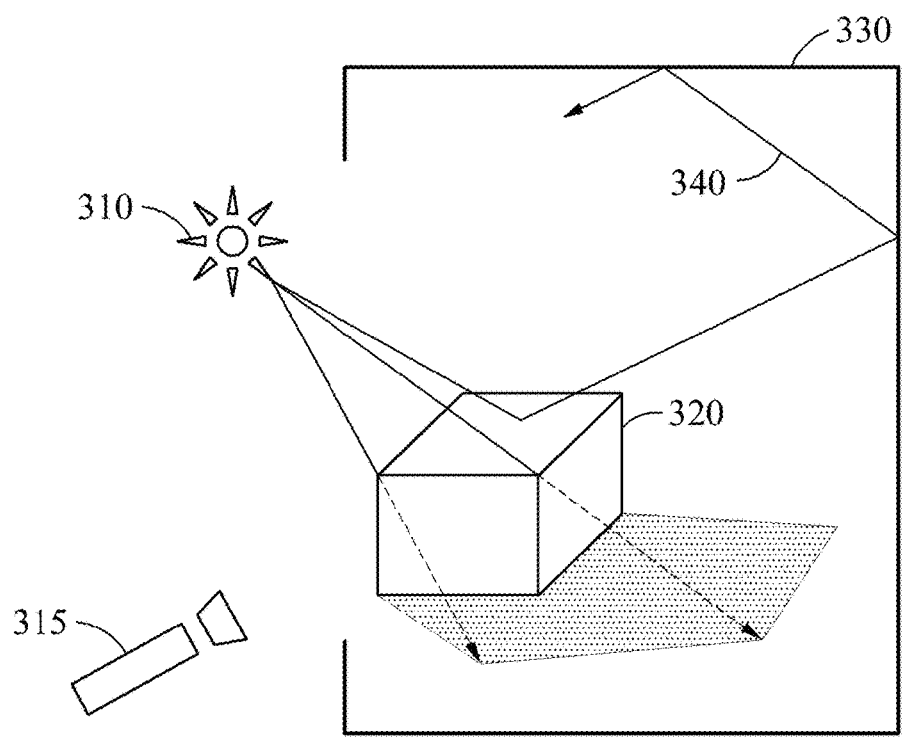
FIGS. 3A and 3B illustrate an example of a relationship between a direct light source and an indirect light source.
Figure 3B:
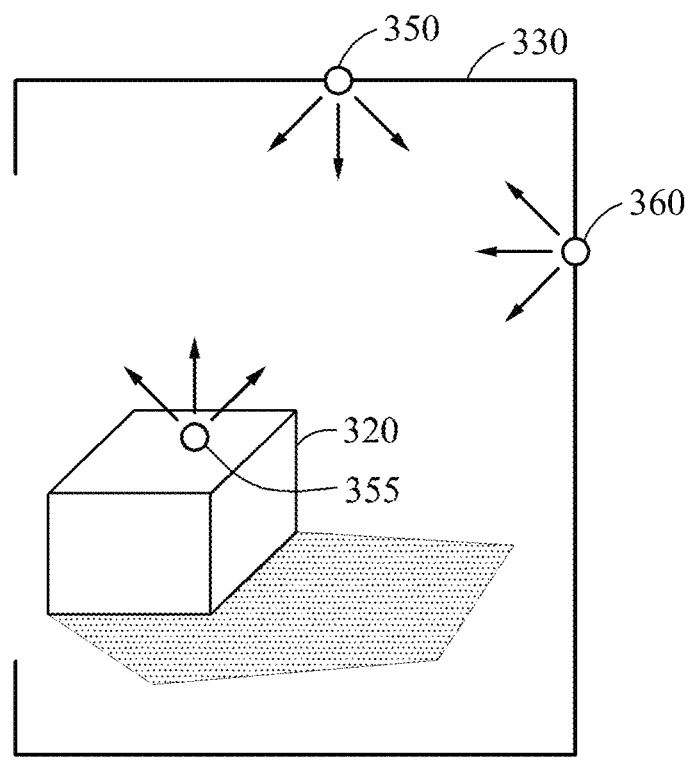

FIGS. 3A and 3B illustrate an example of a relationship between a direct light source and an indirect light source.

Referring to FIG. 3A, a 3D model includes 3D objects, for example, a 3D object 320 and a 3D object 330, and a direct light source 310. Although a single direct light source 310 is illustrated herein for ease of description, the 3D model may have a plurality of direct light sources. The direct light source 310 included in the 3D model is a light source directly radiating light to the 3D object 320. A bright region and a dark region in a virtual space in which the 3D model is to be rendered are first determined based on a positional relationship between the direct light source 310 and the 3D object 320. Light 340 radiated from the direct light source 310 may be reflected, refracted, or diffracted by the 3D object 320. In the example in FIG. 3A, the light 340 output from the direct light source 310 is reflected by the 3D object 320 and then reflected again by the 3D object 330. In the example in FIG. 3A, the 3D object 330 is a wall surrounding an adjacent area of the 3D object 320. The 3D model is rendered from a viewpoint of a camera 315, and a resulting image obtained by the rendering is provided to a user.

A 3D rendering apparatus renders the 3D model by applying, to the 3D model, an indirect lighting effect of light output from an indirect light source in addition to a direct lighting effect of the light 340 output from the direct light source 310. The indirect light source is a light source radiating light in a region in which the light 340 radiated from the direct light source 310 is reflected, refracted, or diffracted. Referring to FIG. 3B, an indirect light source 355 is positioned in a region in which the light 340 output from the direct light source 310 is reflected by the 3D object 320, and indirect light sources 350 and 360 are positioned in respective regions in which the light 340 is reflected by the 3D object 330. In an operation on which the 3D model including the 3D objects 320 and 330 is rendered, illumination effects by the indirect light sources 350, 355, and 360 in addition to the direct light source 310 are applied to the 3D model, and thus the 3D model may be rendered.

The indirect light sources 350, 355, and 360 are affected by the direct light source 310 and also by characteristics of the regions of the 3D model in which the indirect light sources 350, 355, and 360 are positioned. The indirect light sources 350, 355, and 360 radiate light with different colors based on a color of a surface of the 3D model on which each of the indirect light sources 350, 355, and 360 is positioned. For example, when a color of a surface of the 3D object 320 on which the indirect light source 355 is positioned is red, the indirect light source 355 radiates red light to adjacent areas.

Figure 4:
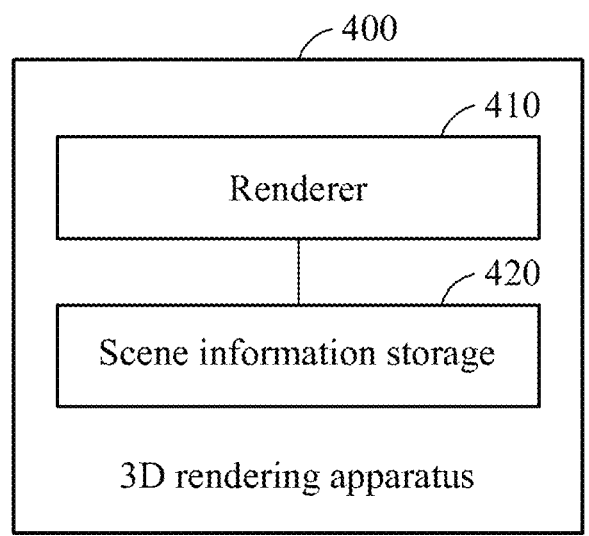
FIG. 4 is a diagram illustrating an example of a configuration of a 3D rendering apparatus.

FIG. 4 is a diagram illustrating an example of a configuration of a 3D rendering apparatus 400.

The 3D rendering apparatus 400 renders a 3D model and outputs a resulting image obtained by the rendering. In an environment in which a plurality of direct light sources are present in the 3D model, the 3D model rendering apparatus 400 samples indirect light sources associated with direct light sources, arranges the sampled indirect light sources in the 3D model, and applies an indirect lighting effect of the indirect light sources to the 3D model. Referring to FIG. 4, the 3D rendering apparatus 400 includes a renderer 410 and a scene information storage 420.

The renderer 410 renders the 3D model. The renderer 410 samples the indirect light sources for the indirect lighting effect, and renders the 3D model by applying a direct lighting effect of the direct light sources and the indirect lighting effect of the indirect light sources to the 3D model.

The renderer 410 renders the 3D model from each viewpoint of the direct light sources and obtains scene information on scenes rendered from each viewpoint of the direct light sources. For example, the scene information may include attribute information including any one or any combination of any two or more of an intensity, a normal, a color, a reflected flux, a position, a depth value, and other parameters of a pixel included in each scene. The renderer 410 may sequentially render the 3D model from each viewpoint of the direct light sources based on an attribute, or render the 3D model only once based on the attribute using a multiple render targets (MRT) function. The scene information storage 420 stores the scene information on the scenes rendered from each viewpoint of the direct light sources, and the stored scene information is used to generate a matched image or render the 3D model.

The renderer 410 generates the matched image in which the scenes rendered from each viewpoint of the direct light sources are matched based on the scene information. The renderer 410 generates the matched image by combining overlapping or matched regions in the scenes. The renderer 410 identifies identical regions corresponding to each other in the scenes rendered from each viewpoint of the direct light sources using the scene information, and generates the matched image by combining the scenes rendered from each viewpoint of the direct light sources by combining the identical regions.

For example, the renderer 410 selects a reference direct light source from a plurality of direct light sources, and changes a result of rendering from each viewpoint of remaining direct light source that is not the reference direct light source based on a viewpoint of the reference direct light source. The renderer 410 generates the matched image by combining a result of rendering from the viewpoint of the reference direct light source and the changed result of the rendering from each viewpoint of the remaining direct light sources.

The renderer 410 may readily generate the matched image using information associated with the 3D model and camera parameter information. For example, the renderer 410 may change the result of the rendering from each viewpoint of the remaining direct light sources based on the viewpoint of the reference direct light source using the camera parameter information to be used for rendering from each viewpoint of the direct light sources, and generate the matched image by combining results of rendering associated with the respective direct light sources. Information associated with camera intrinsic parameters or information associated with camera extrinsic parameters may be used as the camera parameter information. For example, the intrinsic parameters may include information on a focal length and a principal point, and the extrinsic parameters may include information on 3D world coordinates of a camera and a heading direction of the camera.

In one example, the renderer 410 generates matched images based on each set of the attribute information. A set of attribute information is one type of attribute information for each of the scenes rendered from each viewpoint of the direct light sources. For example, one set of attribute information may be intensity information for each of the scenes rendered from each viewpoint of the direct light sources, or depth value information for each of the scenes rendered from each viewpoint of the direct light sources. The renderer 410 generates a matched image associated with a different set of the attribute information based on a result of matching scenes associated with one set of the attribute information. For example, the renderer 410 generates a matched image associated with an intensity attribute, and generates a matched image associated with a depth value attribute by applying a result of matching scenes associated with the intensity attribute to an operation of matching scenes associated with the depth value attribute.

When the 3D model is rendered from each viewpoint of the direct light sources, sets of the attribute information are simultaneously generated in association with identical 3D model coordinates and identical direct light sources. Thus, when an operation of matching scenes associated with one attribute is completed, a result of the matching may be used in an operation of matching scenes associated with another attribute. Thus, although the matched images based on each set of the attribute information to be used for sampling an indirect light source and processing an indirect lighting effect are needed, the operation of matching the scenes does not need to be performed for a number of times corresponding to the number of sets of the attribute information, but needs to be performed only once. To increase an efficiency of resources such as a storage space, the scene information stored in the scene information storage 420 may be deleted after the matched images based on each set of the attribute information are generated.

The renderer 410 samples at least one indirect light source using the matched image. The renderer 410 samples the indirect light source from the matched image using any of various sampling methods known to one of ordinary skill in the art, for example, an importance sampling method. In the importance sampling method, the renderer 410 determines a probability that the indirect light source is to be sampled in each region of the matched image based on an attribute such as an intensity, a color, and a flux indicated in the matched image, and samples the indirect light source from the matched image based on the determined probability. The renderer 410 arranges the indirect light source in a region of the 3D model through the operation of sampling the indirect light source, and determines whether to apply an indirect lighting effect to the region.

In another example, the renderer 410 divides the matched image into a plurality of regions, and selectively samples an indirect light source only in a region of interest in which the indirect light source is desired to be sampled among the regions. The region of interest may be selected by a user, or determined based on a brightness distribution of the matched image or a movement of a 3D object. For example, a region having a greater mean brightness than a predetermined value, or a region in which a moving 3D object is present, may be determined to be the region of interest among the regions included in the matched image. The renderer 410 generates an individual importance map for each region of interest, and performs the importance sampling method in the region of interest using the generated importance map. The renderer 410 may generate, in parallel, importance maps of a plurality of regions of interest. The renderer 410 may predetermine a number of indirect light sources to be sampled for each region of interest, and sample the predetermined number of the indirect light sources from the region of interest. The renderer 410 determines the number of the indirect light sources to be sampled from the region of interest based on any one or any combination of any two or more of a brightness distribution, a color distribution, and a flux distribution of the matched image.

Although the direct light sources may have different characteristics with respect to one attribute, the different characteristics may be processed together by combining them in the operation of sampling the indirect light source from the matched image. For example, when a first direct light source and a second direct light source illuminate a shared region in the 3D model, and the first direct light source and the second direct light source have different colors, an indirect light source sampled from the shared region will have a characteristic of a blended color of the first direct light source and the second direct light source. When indirect light sources from direct light sources having different characteristics are arranged in a shared region in the 3D model, attributes of the direct light sources may be combined to sample the indirect light sources, and thus a quality or a definition of a resulting image obtained by the rendering may be improved.

The renderer 410 applies an indirect lighting effect of the indirect light source to the region of the 3D model determined through the operation of sampling the indirect light source. The renderer 410 extracts information used for calculating the indirect lighting effect from the matched images generated based on each set of the attribute information, and calculates the indirect lighting effect in the region in which the indirect light source is arranged using the extracted information. The renderer 410 renders the 3D model by applying, to the 3D model, the indirect lighting effect of the indirect light source.

In another example, the renderer 410 applies multiview matching only to a portion of all direct light sources included in the 3D model. For example, when a greater number of indirect light sources is to be sampled, or sampling of a separate indirect light source is needed for a direct light source, the renderer 410 applies the multiview matching only to the portion of the direct light sources. The renderer 410 generates a single matched image by matching scenes rendered from each viewpoint of the portion of the direct light sources, and samples an indirect light source from the matched image. The renderer 410 renders the 3D model from each viewpoint of the portion of the direct light sources, and stores scene information on the scenes rendered from each viewpoint of the portion of the direct light sources. The renderer 410 generates a first image in which the scenes rendered from each viewpoint of the portion of the direct light sources are matched based on the scene information, and samples an indirect light source from the first image. The renderer 410 then generates a second image by rendering the 3D model from a viewpoint of a remaining direct light source not included in the portion of the direct light sources, and samples an indirect light source from the second image. When there are a plurality of remaining direct light sources, the renderer 410 renders the 3D model from each viewpoint of the remaining direct light sources to generate a plurality of second images, and samples an indirect light source from each second image. The renderer 410 combines results of sampling the indirect light sources and arranges the indirect light sources in the 3D model.

In another example, the renderer 410 compares scenes rendered from each viewpoint of direct light sources, and determines whether to generate a matched image in which the scenes are matched based on a result of the comparing. For example, when a size of overlapping or matched regions in the scenes or a ratio of the size of the overlapping or matched regions to a size of the scenes satisfies a predetermined condition, the renderer 410 determines to generate the matched image. In other cases, the renderer 410 determines not to generate the matched image. When the renderer 410 determines to generate the matched image, the renderer 410 generates the matched image based on scene information on the scenes. The renderer 410 samples an indirect light source from the matched image, and applies an indirect lighting effect to the 3D model based on a result of the sampling. Conversely, when the renderer 410 determines not to generate the matched image, the renderer 410 generates a plurality of images by rendering the 3D model from each viewpoint of the direct light sources, and separately samples an indirect light source from each generated image.

Figure 5:
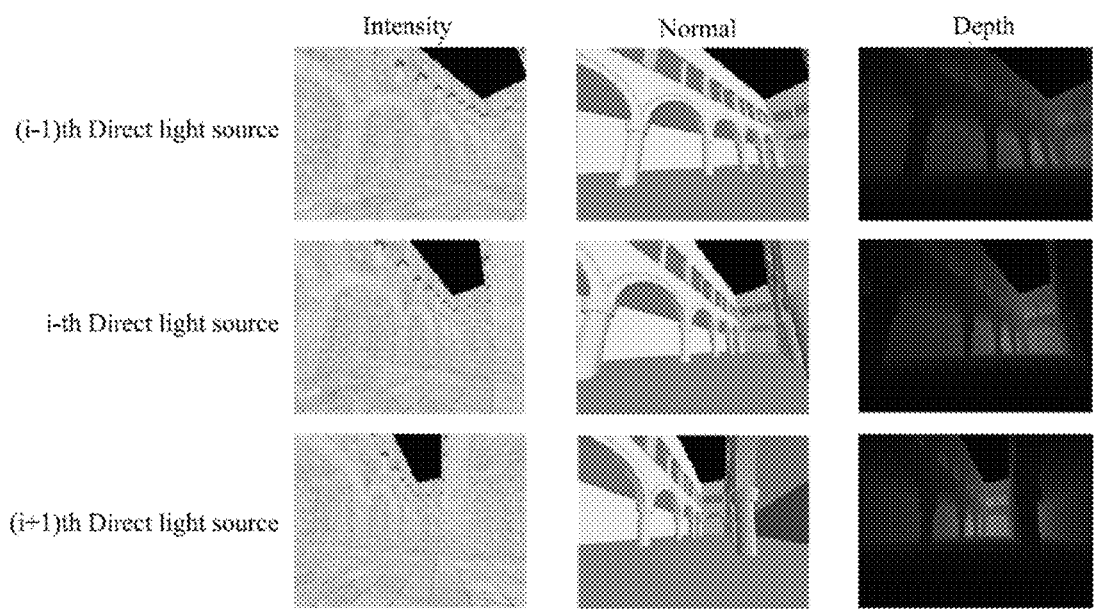
FIG. 5 illustrates an example of intensity, normal, and depth value attributes of three scenes rendered from each viewpoint of (i−1)th, i-th, and (i+1)th direct light sources.

FIG. 5 illustrates an example of intensity, normal, and depth value attributes of three scenes rendered from each viewpoint of (i−1)th, i-th, and (i+1)th direct light sources. The intensity attribute information of the three scenes rendered from each viewpoint of the (i−1)th, i-th, and (i+1)th direct light sources is a set of intensity attribute information. The normal attribute information of the three scenes rendered from each viewpoint of the (i−1)th, i-th, and (i+1)th direct light sources is a set of normal attribute information. The depth value attribute information of the three scenes rendered from each viewpoint of the (i−1)th, i-th, and (i+1)th direct light sources is a set of depth value attribute information.

Figure 6:
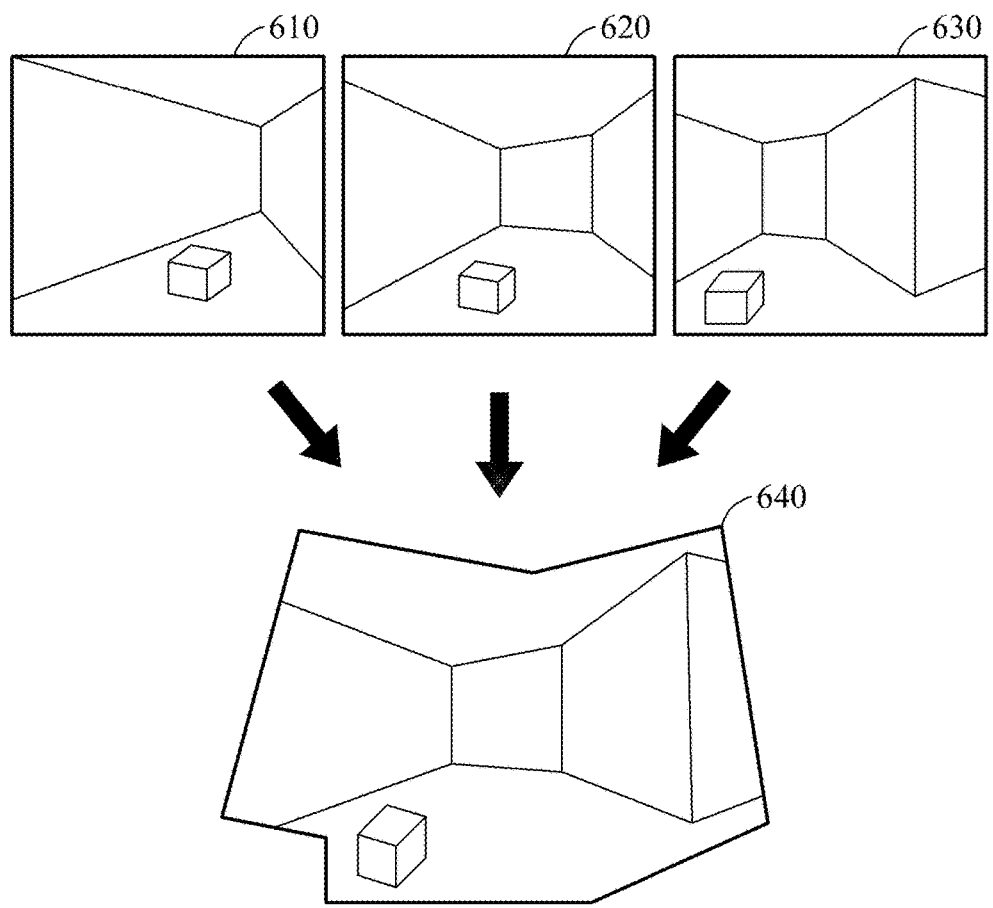
FIG. 6 illustrates an example of a process of matching scenes rendered from each viewpoint of direct light sources and generating a matched image in which the scenes are matched.

FIG. 6 illustrates an example of a process of matching scenes rendered from each viewpoint of direct light sources and generating a matched image in which the scenes are matched.

Referring to FIG. 6, three direct light sources render a 3D model from different viewpoints to obtain respective scenes, i.e., a scene 620, a scene 620, and a scene 630. The scenes 610, 620, and 630 are scenes rendered with respect to at least one attribute of the 3D model. For example, the scenes 610, 620, and 630 may be obtained by rendering the 3D model with respect to any one or any combination of any two or more of an intensity, a depth value, a position, a normal, a reflected flux, and a color of the 3D model.

A 3D rendering apparatus generates a single matched image 640 by matching the scenes 610, 620, and 630 rendered from the respective viewpoints of the three direct light sources. The 3D rendering apparatus generates the matched image 640 by combining matched or overlapping regions in the scenes 610, 620, and 630. For example, the 3D rendering apparatus selects a direct light source associated with the scene 620 as a reference direct light source from the three direct light sources, and changes the other scenes 610 and 630 rendered from respective viewpoints of remaining direct light sources that are not the reference direct light source based on a viewpoint of the reference direct light source. The 3D rendering apparatus generates the matched image 640 by combining a result of the changing of the scenes 610 and 630 and the scene 620 rendered from the viewpoint of the reference direct light source.

Figure 7:
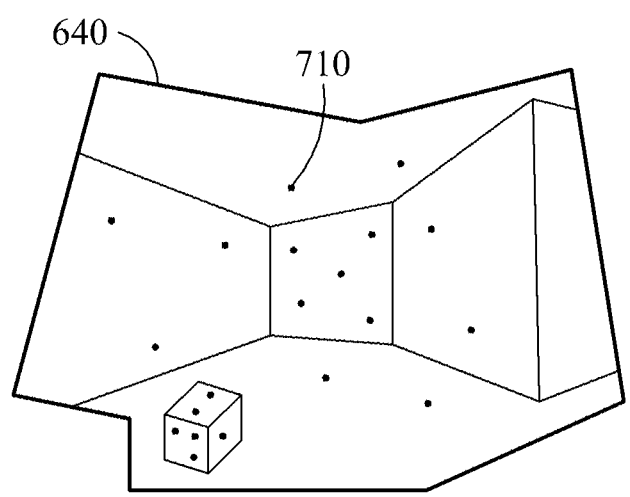
FIG. 7 illustrates an example of a process of sampling an indirect light source from a matched image.

FIG. 7 illustrates an example of a process of sampling an indirect light source 710 from the matched image 640 of FIG. 6.

Referring to FIG. 7, a 3D rendering apparatus samples the indirect light source 710 providing an indirect lighting effect from the matched image 640, and determines a region in which the indirect light source 710 is to be arranged in a 3D model based on a result of the sampling. For example, the 3D rendering apparatus samples the indirect light source 710 from the matched image 640 using an importance sampling method. In the importance sampling method, a probability that the indirect light source 710 is to be sampled is determined based on an attribute, for example, an intensity, a color, and a flux, indicated in the matched image 640, and information on the determined probability is expressed as an importance map. The 3D rendering apparatus samples the indirect light source 710 from the matched image 640 based on the information on the probability included in the importance map.

For example, the 3D rendering apparatus samples the indirect light source 710 based on an intensity distribution, a bidirectional reflectance distribution function (BRDF), or a bidirectional surface scattering reflectance distribution function (BSSRDF) of the matched image 640. For example, the 3D rendering apparatus determines information on a probability that the indirect light source 710 is to be sampled based on a light intensity value of each pixel included in the matched image 640, and determines a region in which the indirect light source 710 is to be arranged based on the determined information on the probability. A probability that the indirect light source 710 is to be sampled from a bright region in the matched image 640 may be set relatively higher than a probability that the indirect light source 710 is to be sampled from a dark region in the matched image 640.

Figure 8:
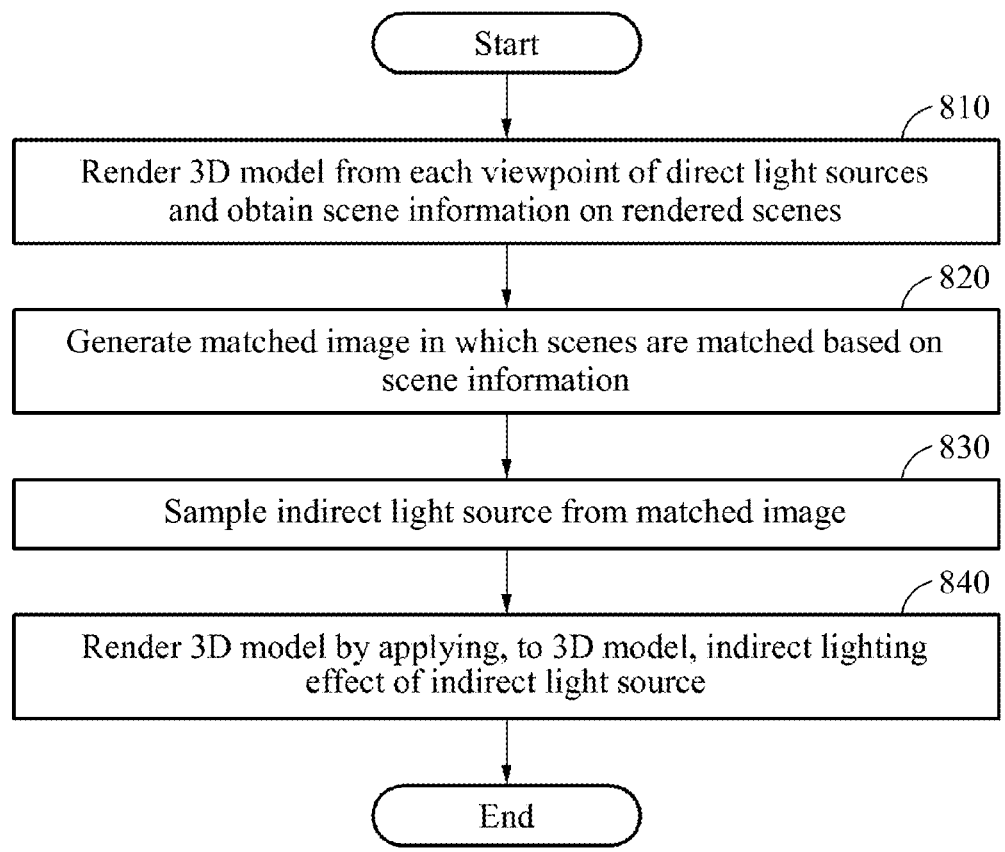
FIG. 8 is a flowchart illustrating an example of a 3D rendering method.

FIG. 8 is a flowchart illustrating an example of a 3D rendering method. The 3D rendering method described hereinafter is performed by a 3D rendering apparatus.

Referring to FIG. 8, in operation 810, the 3D rendering apparatus renders a 3D model from each viewpoint of direct light sources and obtains scene information on scenes rendered from each viewpoint of the direct light sources. For example, the scene information may include attribute information including any one or any combination of any two or more of an intensity, a normal, a color, a reflected flux, a position, a depth value, and other parameters of pixels included in each scene.

In operation 820, the 3D rendering apparatus generates a matched image in which the scenes rendered from each viewpoint of the direct light sources are matched based on the scene information obtained in operation 810. The 3D rendering apparatus generates a single matched image by matching the scenes rendered from each viewpoint of the direct light sources using any of various matching methods known to one of ordinary skill in the art. The 3D rendering apparatus generates a matched image based on each set of attribute information, and generates a matched image associated with a different set of attribute information based on a result of matching scenes associated with one set of attribute information.

In operation 830, the 3D rendering apparatus samples at least one indirect light source using the matched image generated in operation 820. For example, the 3D rendering apparatus determines a probability that an indirect light source is to be sampled in each region of the matched image based on an attribute, for example, an intensity, a color, and a flux, indicated in the matched image, and samples the indirect light source from the matched image based on the determined probability.

In operation 840, the 3D rendering apparatus renders the 3D model by applying an indirect lighting effect of the indirect light source to the 3D model. The 3D rendering apparatus implements a global illumination effect by applying, to the 3D model, indirect light shading of the indirect light source and direct light shading of the direct light sources. The 3D rendering apparatus outputs a resulting image obtained by rendering the 3D model.

Figure 9:
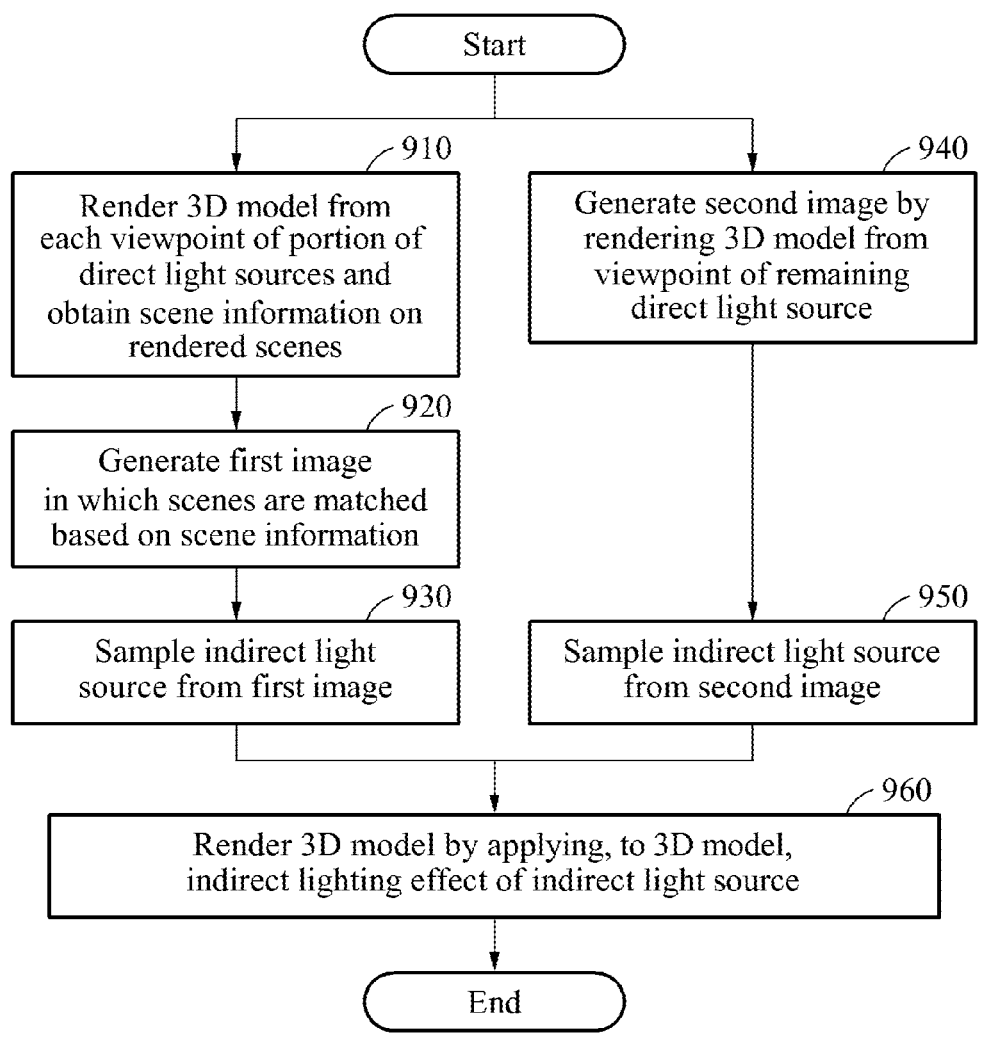
FIG. 9 is a flowchart illustrating another example of a 3D rendering method.

FIG. 9 is a flowchart illustrating another example of a 3D rendering method. The 3D rendering method described hereinafter is performed by a 3D rendering apparatus.

Referring to FIG. 9, in operation 910, the 3D rendering apparatus renders a 3D model from each viewpoint of a portion of all direct light sources, and obtains scene information on scenes rendered from each viewpoint of the portion of the direct light sources.

In operation 920, the 3D rendering apparatus generates a first image in which the scenes rendered from each viewpoint of the portion of the direct light sources are matched based on the scene information obtained in operation 910. The 3D rendering apparatus generates the first image by combining matched or overlapping regions in the scenes rendered from each viewpoint of the portion of the direct light sources. The 3D rendering apparatus generates the first image based on information on the 3D model and camera parameter information associated with each viewpoint of the portion of the direct light sources. The 3D rendering apparatus generates the first image based on each set of attribute information. The 3D rendering apparatus generates the first image associated with a different set of attribute information based on a result of matching scenes associated with one set of attribute information.

In operation 930, the 3D rendering apparatus samples an indirect light source using the first image generated in operation 920. The 3D rendering apparatus samples the indirect light source from the first image using any of various sampling methods known to one of ordinary skill in the art, for example, an importance sampling method.

In operation 940, the 3D rendering apparatus generates a second image by rendering the 3D model from a viewpoint of a remaining direct light source not included in the portion of the direct light sources. When there are a plurality of remaining direct light sources, the 3D rendering apparatus generates a plurality of second images by rendering the 3D model from respective viewpoints of the remaining direct light sources. However, for simplicity of description, FIG. 9 illustrates an example in which there is only one remaining direct light source.

In operation 950, the 3D rendering apparatus samples an indirect light source using the second image generated in operation 940. Similarly to operation 930, the 3D rendering apparatus samples the indirect light source from the second image using, for example, the importance sampling method.

In operation 960, the 3D rendering apparatus renders the 3D model by applying an indirect lighting effect of the indirect light sources to the 3D model. The 3D rendering apparatus determines a region in which the indirect light sources are to be arranged in the 3D model based on the indirect light source sampled from the first image and the indirect light source sampled from the second image. The 3D rendering apparatus arranges the indirect light sources in the determined region in the 3D mode, and applies the indirect lighting effect to the 3D model by performing indirect light shading.

Figure 10:
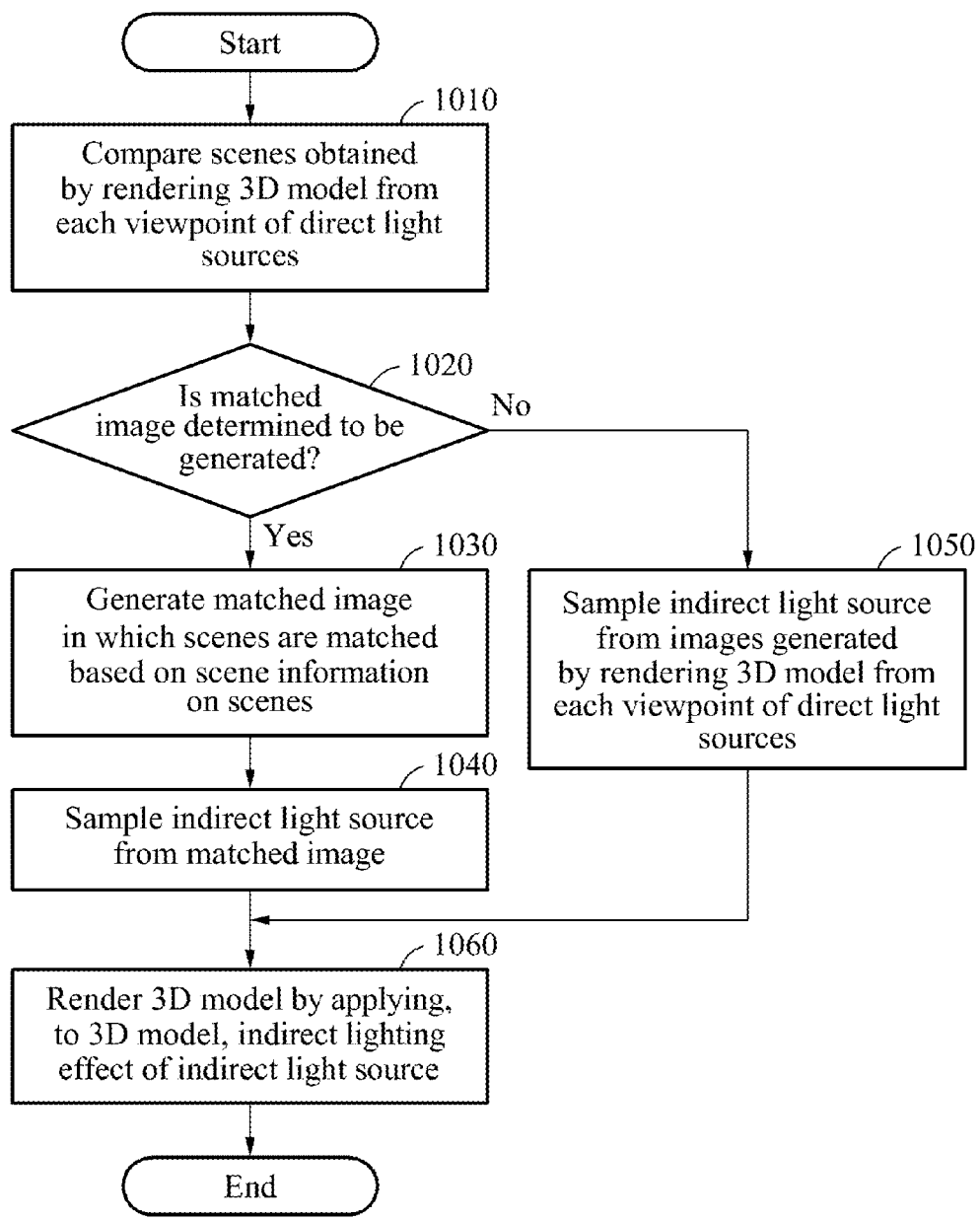
FIG. 10 is a flowchart illustrating another example of a 3D rendering method.

FIG. 10 is a flowchart illustrating another example of a 3D rendering method. The 3D rendering method described hereinafter is performed by a 3D rendering apparatus.

Referring to FIG. 10, in operation 1010, the 3D rendering apparatus compares scenes obtained by rendering a 3D model from each viewpoint of direct light sources. For example, the 3D rendering apparatus compares the scenes rendered from each viewpoint of the direct light sources, determines whether matched or overlapping regions are present in the scenes, and determines a size of the matched or overlapping regions or a ratio of the size of the matched regions to a size of the scenes.

In operation 1020, the 3D rendering apparatus matches the scenes rendered from each viewpoint of the direct light sources and determines whether to generate a matched image based on a result of the comparing performed in operation 1010. For example, when the size of the matched or overlapping regions in the scenes or the ratio of the size of the matched regions to the size of the scenes satisfies a predetermined condition, the 3D rendering apparatus determines to generate the matched image. When only small or no matched or overlapping regions are present in the scenes rendered from each viewpoint of the direct light sources, the 3D rendering apparatus determines not to generate the matched image.

In operation 1030, when the 3D rendering apparatus determines to generate the matched image in operation 1020, the 3D rendering apparatus generates the matched image based on scene information on the scenes rendered from each viewpoint of the direct light sources. The 3D rendering apparatus generates the matched image by combining the matched or overlapping regions in the scenes.

In operation 1040, the 3D rendering apparatus samples an indirect light source using the matched image generated in operation 1030. The 3D rendering apparatus samples the indirect light source from the matched image using any of various sampling methods known to one of ordinary skill in the art, for example, an importance sampling method.

In operation 1050, when the 3D rendering apparatus determines not to generate the matched image in operation 1020, the 3D rendering apparatus samples the indirect light source using a plurality of images generated by rendering the 3D model from each viewpoint of the direct light sources. The 3D rendering apparatus generates the images by rendering the 3D model from each viewpoint of the direct light sources, and separately samples the indirect light source from each generated image.

In operation 1060, the 3D rendering apparatus renders the 3D model by applying, to the 3D model, an indirect lighting effect of the indirect light source sampled in operation 1040 or the indirect light sources sampled in operation 1050.

The configuration and/or the method described in the foregoing reduces an amount of time used for 3D rendering by performing indirect light source sampling a number of times that is less than a total number of direct light sources. When images generated from all direct light sources are matched, indirect light sources are generated by performing only a one-time indirect light source sampling. Thus, a total number of indirect light source samplings is less than the total number of the direct light sources, even if images generated from a portion of the direct light sources are matched.

The 3D rendering apparatus 400, the renderer 410, and the scene information storage 420 in FIG. 4 that perform the operations described herein with respect to FIGS. 1-10 are implemented by hardware components. Examples of hardware components include controllers, generators, drivers, memories, comparators, arithmetic logic units, adders, subtractors, multipliers, dividers, integrators, and any other electronic components known to one of ordinary skill in the art. In one example, the hardware components are implemented by computing hardware, for example, by one or more processors or computers. A processor or computer is implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices known to one of ordinary skill in the art that is capable of responding to and executing instructions in a defined manner to achieve a desired result. In one example, a processor or computer includes, or is connected to, one or more memories storing instructions or software that are executed by the processor or computer. Hardware components implemented by a processor or computer execute instructions or software, such as an operating system (OS) and one or more software applications that run on the OS, to perform the operations described herein with respect to FIGS. 1-10. The hardware components also access, manipulate, process, create, and store data in response to execution of the instructions or software. For simplicity, the singular term "processor" or "computer" may be used in the description of the examples described herein, but in other examples multiple processors or computers are used, or a processor or computer includes multiple processing elements, or multiple types of processing elements, or both. In one example, a hardware component includes multiple processors, and in another example, a hardware component includes a processor and a controller. A hardware component has any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 8-10 that perform the operations described herein with respect to FIGS. 1-10 are performed by a processor or a computer as described above executing instructions or software to perform the operations described herein.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any device known to one of ordinary skill in the art that is capable of storing the instructions or software and any associated data, data files, and data structures in a non-transitory manner and providing the instructions or software and any associated data, data files, and data structures to a processor or computer so that the processor or computer can execute the instructions. In one example, the instructions or software and any associated data, data files, and data structures are distributed over network-coupled computer systems so that the instructions and software and any associated data, data files, and data structures are stored, accessed, and executed in a distributed fashion by the processor or computer.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A three-dimensional (3D) rendering method for rendering a 3D model, the method comprising:
   rendering, at a processor, the 3D model from respective viewpoints of direct light sources;
   obtaining scene information on scenes rendered from the respective viewpoint of direct light sources;
   selecting a direct light source from the direct light sources as a reference direct light source;
   changing the scenes rendered from respective viewpoints of direct light sources that are not the reference direct light source to a viewpoint of the reference direct light source using camera parameter information;
   generating a matched image by combining a direct scene rendered from the viewpoint of the direct light source and the changed scenes in which the scenes are matched by combining overlapping regions in the direct scene and the changed scenes;
   sampling at least one indirect light source from the matched image; and
   arranging the at least one indirect light source in a position in the 3D model corresponding to a position of the sampled indirect light source in the matched image.

2. The method of claim 1, wherein the generating of the matched image comprises generating the matched image by combining matched regions in the scenes.

3. The method of claim 1, wherein the generating of the matched image comprises generating the matched image based on camera parameter information associated with each viewpoint of the direct light sources.

4. The method of claim 1, wherein the sampling of the indirect light source comprises:
   dividing the matched image into regions; and
   sampling the indirect light source in a region of interest in which the indirect light source is to be sampled among the regions.

5. The method of claim 1, further comprising rendering the 3D model by applying, to the 3D model, an indirect lighting effect of the at least one sampled indirect light source.

6. The method of claim 1, wherein the direct light sources directly radiate light to a 3D object; and
   the at least one indirect light source radiates light from a region in which the light radiated from the direct light sources is reflected, refracted, or diffracted.

7. A non-transitory computer-readable storage medium storing instructions to cause computing hardware to perform the method of claim 1.

8. A three-dimensional (3D) rendering apparatus comprising:
   a processor configured to render a 3D model from respective viewpoints of direct light sources; and
   a scene information storage configured to store scene information on scenes rendered from the respective viewpoint of direct light sources,
   wherein the processor is further configured to
      select a direct light source from the direct light sources as a reference direct light source,
      change the scenes rendered from respective viewpoints of direct light sources that are not the reference direct light source to a viewpoint of the reference direct light source using camera parameter information,
      generate a matched image by combining a direct scene rendered from the viewpoint of the direct light source and the changed scenes in which the scenes are matched by combining overlapping regions in the direct scene and the changed scenes,
      sample at least one indirect light source from the matched image, and
      arrange the at least one indirect light source in a position in the 3D model corresponding to a position of the sampled indirect light source in the matched image.

9. The apparatus of claim 8, wherein the scene information comprises first and second attribute information comprising any one or any combination of any two or more of an intensity, a normal, a color, a reflected flux, a position, and a depth value of pixels of each scene.

10. The method of claim 9, wherein the processor is further configured to generate the matched image in which the scenes are matched for each attribute information.

11. The apparatus of claim 8, wherein the processor is further configured to determine whether to generate the matched image by comparing the scenes, and generate the matched image for each scene information on the scenes in response to a result of the determining being to generate the matched image.

12. The apparatus of claim 8, wherein the processor comprises a renderer configured to generate the matched image based on camera parameter information associated with each viewpoint of the direct light sources.

13. The apparatus of claim 8, wherein the processor comprises a renderer configured to render the 3D model by applying, to the 3D model, an indirect lighting effect of the at least one sampled indirect light source.

* * * * *